UNITED STATES PATENT OFFICE.

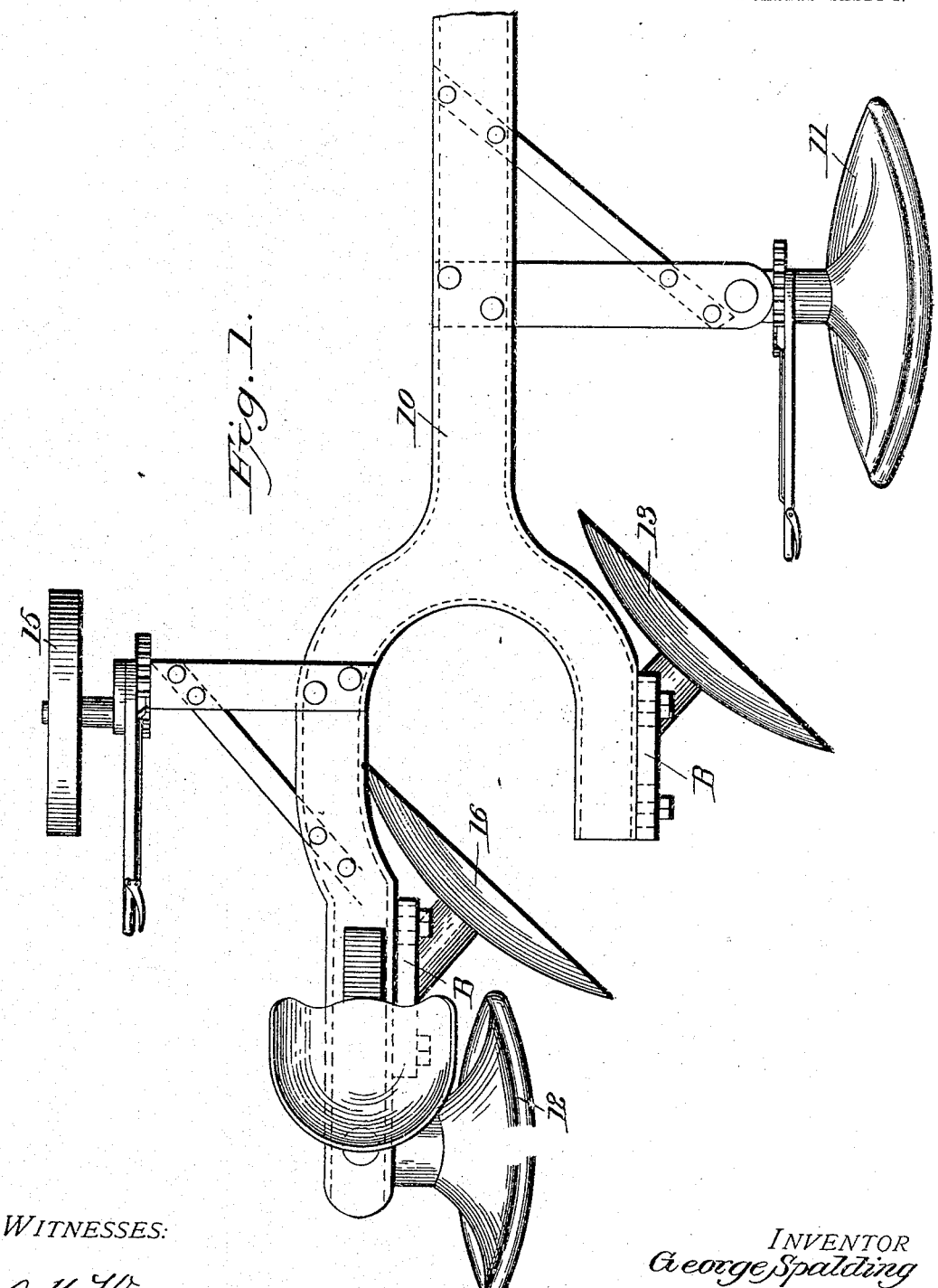

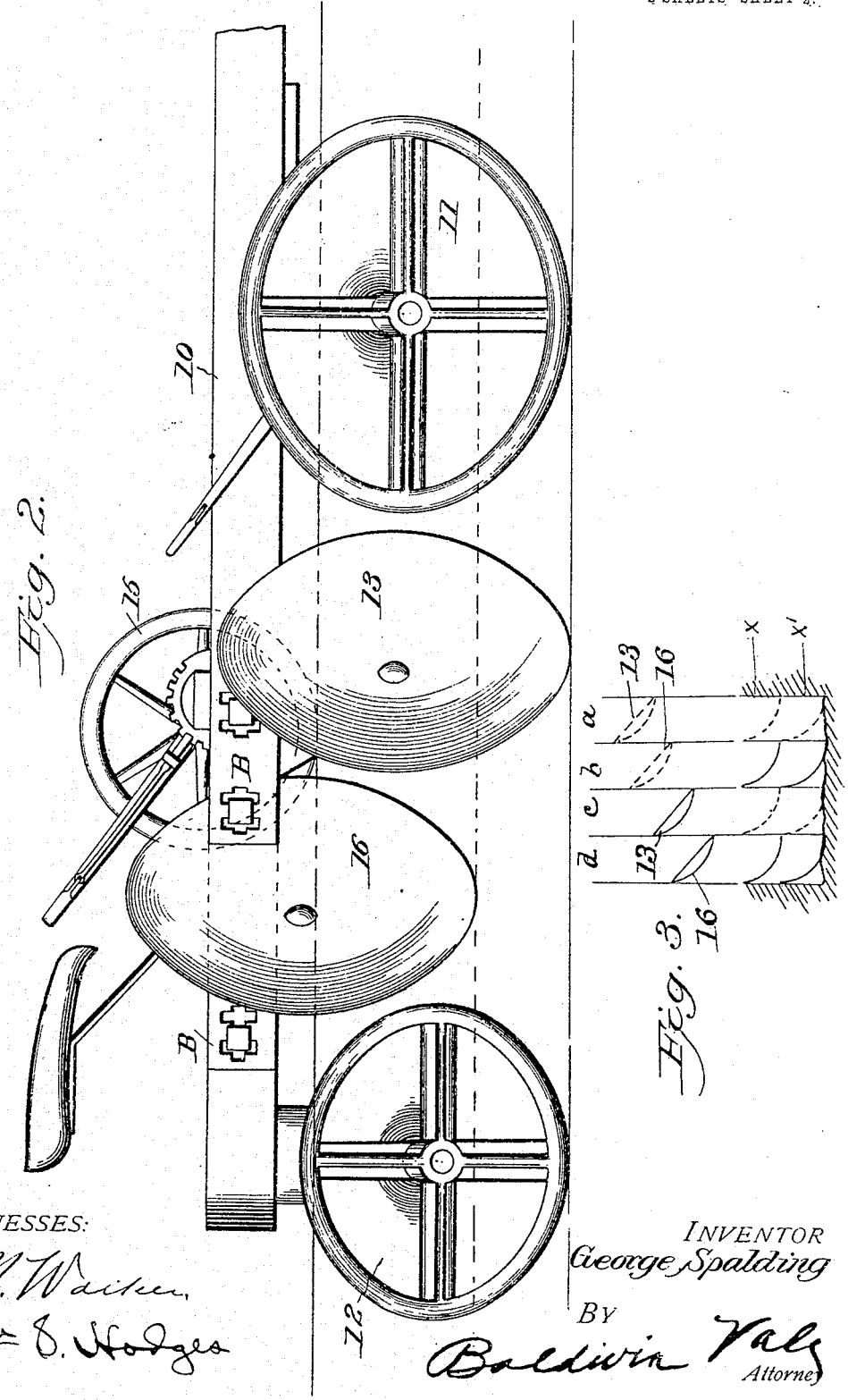

GEORGE SPALDING, OF SAN FRANCISCO, CALIFORNIA.

DISK PLOW.

No. 801,410.　　　Specification of Letters Patent.　　　Patented Oct. 10, 1905.

Application filed September 27, 1904. Serial No. 226,175.

*To all whom it may concern:*

Be it known that I, GEORGE SPALDING, of San Francisco, in the county of San Francisco and State of California, have invented certain new and useful Improvements in Disk Plows; and I do hereby declare the following to be a full, clear, and exact description of the invention, such as will enable others skilled in the art to which it appertains to make and use the same.

This invention relates to certain new and useful improvements in rotary disk plows, and is designed particularly as an improvement upon the form of plow illustrated and described in my pending application for patent, filed September 28, 1903, Serial No. 174,993.

It is well known in the art that the maximum practical working diameter of plow-disks has been found to be approximately twenty-four inches and that approximately about one-third of the diameter of a disk is capable of cutting and turning a furrow economically. The forward edge of the disk from the ground-level to the vertical center of the disk below ground is the cutting edge, which shears off the soil and passes it onto the remaining surface of the submerged disk, up which it is carried by the rotation until the curvature of the disk turns it completely over and spills it into the open furrow of the former cut. The furrow depth to which a twenty-four inch disk can cut is about eight inches, which depth suffices in all ordinary cases. In many instances, however, and particularly in sugar-beet culture, it is necessary to plow to a depth of from twelve to sixteen inches, and this would require a disk forty-eight inches in diameter, with a proportionate convexity, which from a structural and operative standpoint is impracticable.

The object of the invention is to accomplish the plowing of a deep furrow without increasing the diameter of the cutting-disk beyond the proven practical working diameter. In accomplishing this object in the form of my invention covered in the pending application above referred to I have arranged two disks to plow a single furrow, one disk being set forward and above the other and laterally thereto with respect to the convexity of the disk. In such form the two disks coöperate to plow a single furrow in one operation. I have found in practice, however, that equally good results can be secured by arranging the disks to plow a single furrow, one disk being set forward and below the other and laterally thereto with respect to the convexity of the disk. It is this form and arrangement of the disks that comprise the subject-matter of the present invention.

In carrying out the present invention the disks are mounted in a suitable frame, and the number of disks may be increased. They may be set at various angles to each other vertically and laterally, and the proportionate depth of cut of each disk may be varied to suit various circumstances and conditions, or they may be reversed to throw the furrow to the left instead of the right, as illustrated.

The invention will be hereinafter fully set forth, and particularly pointed out in the claims.

In the accompanying drawings, Figure 1 is a plan view illustrating my improved plow. Fig. 2 is a side elevation thereof. Fig. 3 is a diagrammatic view illustrating the operation of my improved plow.

Because of the peculiar angles, curvatures, &c., in the relation of the parts of a disk plow the line of draft becomes the most feasible base from which to calculate. The line of draft is a line through the balance-center of the lateral resistance parallel with the forward direction of the plow movement. In detail the construction consists of the usual frame 10, provided with forward and rear furrow-wheels 11 12, either one or both of which may be pivoted to facilitate turning corners. The disk 13 is suitably mounted in frame 10 and determines the depth of the furrow, which may be regulated by raising and lowering the furrow-wheel 11 and the land-wheel 15. The disk 16 is also suitably mounted in the frame 10 and, as illustrated, is to the left and rear of disk 13 and on a plane above the latter. The said disks are also provided with adjustable brackets B or other means for independent adjustment whereby the vertical distance between the centers of the disks may be varied to increase or diminish their relative positions to regulate the depth of cut of each disk.

The scale carried out in the drawings is one-eighth of full size, and the plow is illustrated as turning a furrow fourteen inches deep and a proportionate width.

The method of plowing such a furrow is diagrammatically illustrated in Fig. 3, the disk 16 being set to plow to a depth of six inches and the disk 13 to a depth of eight inches below disk 16. In plowing with my improved plow the first furrow in order to avoid the formation of a ridge or back furrow is comparatively shallow, and the succeeding furrows gradually increase in depth until the desired standard depth is reached, these various depths being obtained by suitable adjustments of the disks after each round. In Fig. 3 it will be assumed that the desired depth is fourteen inches and that the preliminary furrows have all been plowed. The disk 13 is shown as completing the furrow $a$, while the disk 16 is simultaneously making the first cut (six inches) of furrow $b$, said disks being indicated in dotted lines, the depth of cut of disk 16 being indicated at $x$ and that of disk 13 at $x'$. In the next round the disk 13 traverses the path of disk 16 in furrow $b$, completing the latter while disk 16 is making the preliminary cut of furrow $c$, these steps being continued until the plowing is completed.

From the foregoing it will be perceived that the two disks coöperate to plow a single furrow, but that it requires two operations of the plow to complete each furrow of the desired standard depth. In the operation of the plow the soil raised by disk 16 is delivered into the bottom of the previously-completed furrow, and as a result the disk 13 raises the soil from the bottom of the furrow being completed by it and places the same on top of the soil spilled into the previous furrow by the disk 16. In other words, each disk makes an independent cut of a width proportionate to its depth and the two cuts form the completed furrow. By arranging the disk 16, for instance, to cut a depth of six inches and the disk 13 to cut to a depth eight inches lower a total depth of fourteen inches can be secured; but this depth may be varied according to the adjustment of the disks to suit any desired condition.

The advantages of my improved plow are obvious, for it will be observed that the ground is pulverized to a great depth and the worn-out surface is deeply buried and an entirely new surface thrown up to the action of the sun. It will also be noted that disks of different diameters, curvature, and angle may be combined and any number of gangs or series may be used in one plow. It will be further noted that said disks can also be arranged to throw the soil either to the right or left.

I claim as my invention—

1. A disk plow comprising a plurality of disks adapted to plow a single furrow, said disks being set one in advance, below and to one side of the other, and facing in the same direction.

2. A disk plow comprising a supporting-frame, a plurality of disks supported thereby and set one in advance, below and to one side of the other, and facing in the same direction, and means for varying the relative positions of said disks.

3. A disk plow comprising a supporting-frame, a plurality of disks supported thereby and set one in advance, below and to one side of the other, and facing in the same direction, and means for independently adjusting said disks.

In testimony whereof I have signed this specification in the presence of two subscribing witnesses.

GEORGE SPALDING.

Witnesses:
G. A. BRERETON,
WM. S. HODGES.